United States Patent
Gimple (10) Patent No.: US 11,803,610 B2
(45) Date of Patent: Oct. 31, 2023

(54) SYSTEMS AND METHODS FOR UPDATING POLICY PROFILES

(71) Applicant: Confie Holding II Co., Huntington Beach, CA (US)

(72) Inventor: Jay K. Gimple, Stevenson Ranch, CA (US)

(73) Assignee: Confie Holding II Co., Huntington Beach, CA (US)

(*) Notice: Subject to any disclaimer, the term of this patent is extended or adjusted under 35 U.S.C. 154(b) by 97 days.

(21) Appl. No.: 17/483,185

(22) Filed: Sep. 23, 2021

(65) Prior Publication Data

US 2022/0092149 A1 Mar. 24, 2022

Related U.S. Application Data

(60) Provisional application No. 63/082,847, filed on Sep. 24, 2020.

(51) Int. Cl.
*G06F 16/958* (2019.01)
*G06F 16/955* (2019.01)

(52) U.S. Cl.
CPC .......... *G06F 16/986* (2019.01); *G06F 16/955* (2019.01)

(58) Field of Classification Search
CPC .............. G06F 16/986; G06F 16/955
See application file for complete search history.

(56) References Cited

U.S. PATENT DOCUMENTS

| | | | |
|---|---|---|---|
| 8,868,515 B2* | 10/2014 | Lee | G06F 16/27 707/684 |
| 9,953,372 B1 | 4/2018 | Dziabiak et al. | |
| 11,172,050 B1* | 11/2021 | Lavinio | G06F 16/252 |
| 2009/0172773 A1 | 7/2009 | Moore | |
| 2009/0204446 A1 | 8/2009 | Simon et al. | |
| 2009/0210258 A1 | 8/2009 | Cardot et al. | |
| 2012/0232935 A1 | 9/2012 | Voccola | |
| 2013/0159553 A1 | 6/2013 | Price et al. | |
| 2014/0019266 A1* | 1/2014 | Stoliartchouk | G06Q 30/0277 705/14.73 |

(Continued)

OTHER PUBLICATIONS

PCT International Search Report and Written Opinion, PCT Application No. PCT/US21/51982, dated Dec. 30, 2021.

*Primary Examiner* — Huawen A Peng
(74) *Attorney, Agent, or Firm* — Ravi Mohan; Rutan & Tucker, LLP (57) ABSTRACT

Systems and methods for updating policy profiles can include utilizing one or more machine learning processes to determine a probability of the likelihood that an available insurance policy data point within a set of currently available policy data points is incorrect. The system may further generate a plurality of policy profile data points based on those determined probabilities. This plurality of policy profile data points can be associated with various customer insurance policies. The system can further parse the plurality of data points for collection, generate uniform resource locator data for each data point type and associate each data point with uniform resource locator data. Finally, the system can utilize the generated uniform resource locator data to locate and copy updated data point data related to the associated data point for each data point and format the data point data for transmission to an agent management system for further processing.

19 Claims, 7 Drawing Sheets

(56) References Cited

U.S. PATENT DOCUMENTS

2014/0089008 A1 3/2014 Carrier et al.
2015/0348083 A1 12/2015 Brill et al.
2017/0318327 A1* 11/2017 Mun ................ H04N 21/43622

* cited by examiner

SYSTEMS AND METHODS FOR UPDATING POLICY PROFILES

PRIORITY

This application claims the benefit of and priority to U.S. Provisional Application No. 63/082,847, filed Sep. 24, 2021, the entirety of which is incorporated herein in its entirety.

FIELD

The present disclosure technically relates to insurance customer profiles. More particularly, the present disclosure technically relates to anticipating and automating the collection and enhancement of specified policy information.

BACKGROUND

Insurance policies are typically issued by carriers and can be serviced through one or more agents or brokers. As a result, there are often two primary systems of record for any given policy. The first is an agency management system (AMS) which may often be created by the agent and/or broker during the time of the policy's creation. The second primary system is the carrier's management system (CMS), which is often created in response to the AMS notifying the CMS of a new policy that is ready for intake.

For some policies, the agent and/or broker may initially input data related to the policy at the time of sale but may also connect the insured to interact directly with the carrier for direct pay options. In these instances, the AMS system will not typically be updated as the insured will subsequently only interact with the carrier once the initial policy has been created. The carrier will be able to receive and update the policy records within the CMS in response to processed transactions, record changes, policy rate changes, policy cancellations/lapses, etc. These changes, however, will typically not be known to the AMS system, creating outdated, or "stale" policy data which can negatively affect customer service opportunities.

Traditional methods of updating AMS policy data typically occur during manual account interactions between the insured and the agency/broker. As the agent interacts with the customer, they may notice a difference in information between their AMS system and the carrier CMS or website. In response, the agent/broker manually updates the AMS system with current carrier data from the CMS or website. However, the manual input process can introduce a variety of errors in type and format of data input. Additionally, this update solution only affects the policies that are being serviced by the agent/broker. Further methods of batch updating are also restricted to the limitations of the data format provided by one or more platform vendors and may include unneeded supplemental data which may add unnecessary strain to the available AMS resources.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above regarding the difficulties of maintaining an accurate AMS, systems and methods are shown herein that describe processes for automatically anticipating and automating the collection and enhancement of specified policy data from various carriers. Indeed, a dedicated "feedback loop" of data retrieval and updating can be accomplished by utilizing various embodiments of the instant disclosure. In many embodiments, a policy profile update device may be utilized to select, scrape, and transmit updated policy data to one or more AMSs.

Traditionally, batch data updating based on received carrier data has come from various carrier download transactions such as, but not limited to AL3 format downloads. However, this approach is not always suitable for various reasons. First, not every carrier provides specific formatted data download options. Therefore, many policies are solely left to manual data input options. Secondly, not all AMSs are configured to properly process carrier download transactions like AL3 files or may otherwise be limited to the types or volumes of data that can be captured via the carrier download transaction file intake process. Lastly, the downloaded carrier transaction data may be include extraneous data that is not necessary, required, or otherwise desired by the agent/broker. Extrapolated over numerous policies, this can create an undesirable strain on available computational resources due to the size of the file(s) to be processed.

Thus, various embodiments of the present disclosure disclose methods and systems that can be configured to target and scrape only the desired policy data from one or more carrier systems, including websites. This process can be automated in batches and carried out over any number of policies and carriers. Selection of the data to be scraped and updated can be anticipated by one or more machine learning processes which can then utilize the updated data to better train the system for future data selections. Many policy profile update system embodiments can be configured to generate the scraped updated policy data in any number of formats suitable for intake by an AMS. Although, updated policy data may be formatted into AL3 or similarly compatible formats, it is contemplated that other formats may be utilized based on the needs of the AMS including, but not limited to XML and other XML-based data formats.

The description herein is not to be taken in a limiting sense but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, both terms "logic" and "engine" are representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

As software, logic may be in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "logic," function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as logics, in order to emphasize their implementation independence more particularly. For example, a logic may be implemented as a hardware circuit comprising custom VLSI circuits or gate arrays, off-the-shelf semiconductors such as logic chips, transistors, or other discrete components. A logic may also be implemented in programmable hardware devices such as via field programmable gate arrays, programmable array logic, programmable logic devices, or the like.

Logics may also be implemented at least partially in software for execution by various types of processors. An identified logic function of executable code may, for instance, comprise one or more physical or logical blocks of computer instructions that may, for instance, be organized as an object, procedure, or function. Nevertheless, the executables of an identified logic need not be physically located together but may comprise disparate instructions stored in different locations which, when joined logically together, comprise the logic and achieve the stated purpose for the logic.

Indeed, a logic function of executable code may include a single instruction, or many instructions, and may even be distributed over several different code segments, among different programs, across several storage devices, or the like. Where a logic or portions of a logic are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring data can include the entirety of the data, a portion of the data, a set of the data, and/or a subset of the data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

The description of elements in each figure may refer to elements of proceeding figures. Like numbers may refer to like elements in the figures, including alternate embodiments of like elements.

Figure 1:
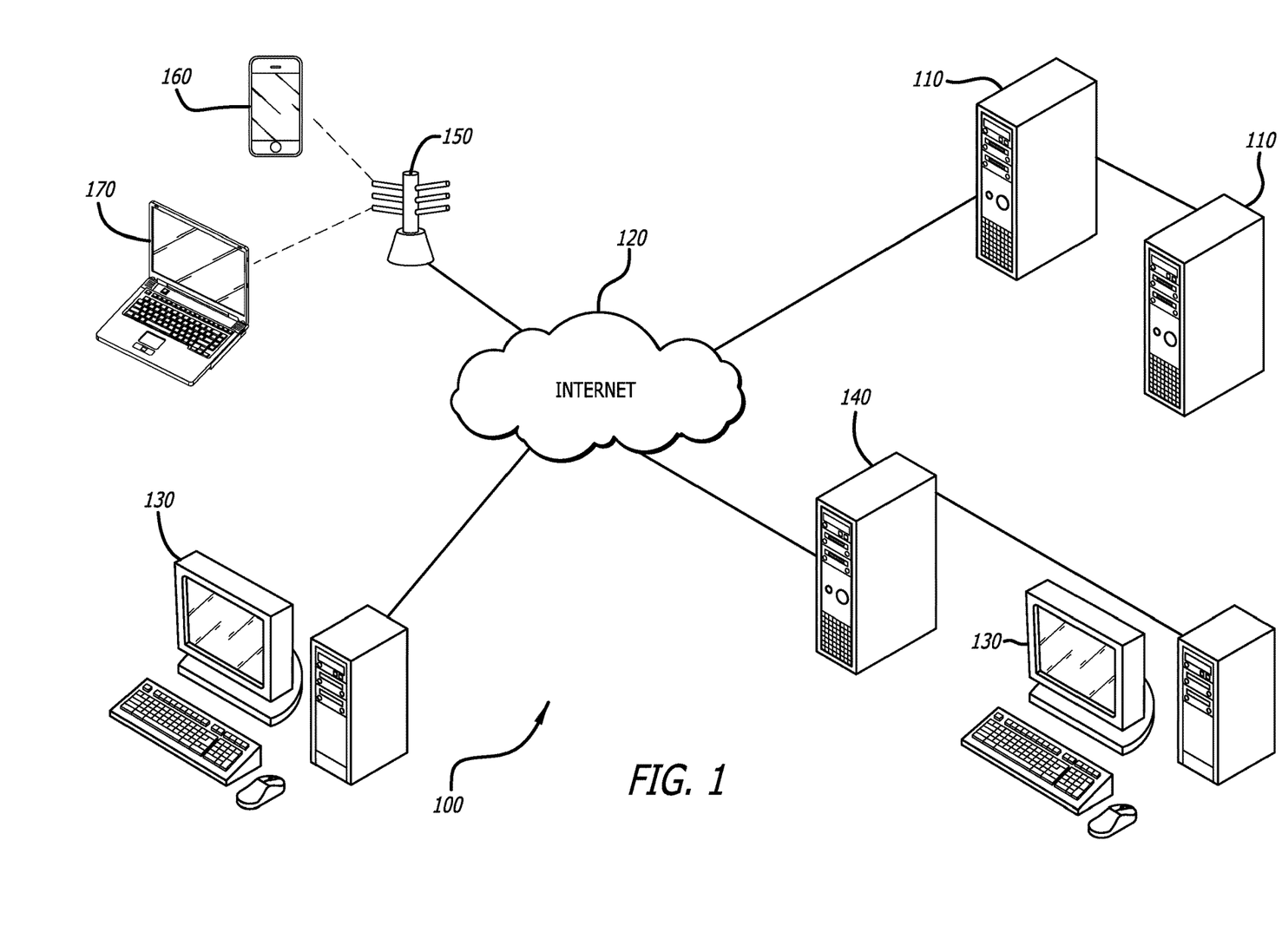
FIG. 1 is a conceptual system diagram of the policy profile update system in accordance with an embodiment of the invention.

Referring to FIG. 1, a conceptual system diagram of the policy profile update system 100 in accordance with an embodiment of the invention is shown. In many embodiments, one or more AMSs 130 will be connected to one or more CMSs 110 over a network such as the Internet 120. As described above, an AMS 130 will typically transmit new policy data to a CMS 110 in response to opening a new policy. As such, upon creation of the policy, two nearly identical sets of policy data exist between both the AMS 130 and CMS 110. When a new policy is enacted, the agent/broker may connect the customer to interact directly with the carrier to facilitate, for example, direct and/or recurring payments. When this occurs, the customer (i.e., the insured) may begin to directly interact with the carrier instead of the agent/broker.

Often, the CMS 110 can function as, or be in communication with a web server that may provide methods for customers to directly interact and add policy data to the CMS 110. A customer may then communicate with the CMS 110 through any type of typical user computing device such as, but not limited to, a laptop 170 or other mobile computing device 160 which may also communicate over the Internet 120, perhaps through one or more wireless access points 150. This may create a one-sided update of policy data that will not be automatically reflected in the AMS 130.

For example, a customer may initially add bank account data for recurring payments upon account creation with the agent/broker but may later change bank accounts or switch to one-time payments by adding in a credit card number and associated payment authorization data while communicating with the CMS 110. After the initial account creation, the two sets of policy data on the AMS 130 and CMS 110 will start to differentiate. In the above example, the CMS 110 would not have any data related to the change in bank accounts or of the payment authorization data. Over time, these differences in policy data can evolve and grow larger.

In response, the agent/broker may implement a policy profile update device 140 which may gather (i.e., scrape) updated policy data directly from the CMS 110. This update process may occur periodically or may be triggered by an external command or other predetermined threshold. As will be described in more detail below, the policy profile update device 140 can be configured to utilize machine learning language to better select which data to gather and when to gather it. In many embodiments, the gathering of data will be in the form of a generalized web scraping that processes one or more carrier websites that are linked to at least one CMS 110.

In some embodiments, the access to the CMS 110 can be enhanced through connections with agent/broker-specific portals and or webpages. These webpages may be pre-existing or can be configured to interact directly with the policy profile update device 140. Access to these webpages may be restricted to authorized agents/brokers who can utilize a validation system to verify their access privileges. Once scraped, the updated policy data can be formatted into any suitable format that can be processed by an AMS 130. In various embodiments, this intake format may be in a traditional AL3 file download format. However, in additional embodiments, the output data may be formatted in a specific intake data format.

While the embodiment depicted in FIG. 1 shows a policy profile update device 140 as separate from the AMS 130, it is contemplated that various embodiments may comprise a policy profile update device as software that may be operated from within the AMS 130. Indeed, in further embodiments, policy profile updating can be carried out as a remote-based service or may be configured to operate directly on the CMS 110. Those skilled in the art will understand that the operation of the policy profile update device 140 may be configured to any number of arrangements based on the needs of the desired application.

Figure 2:
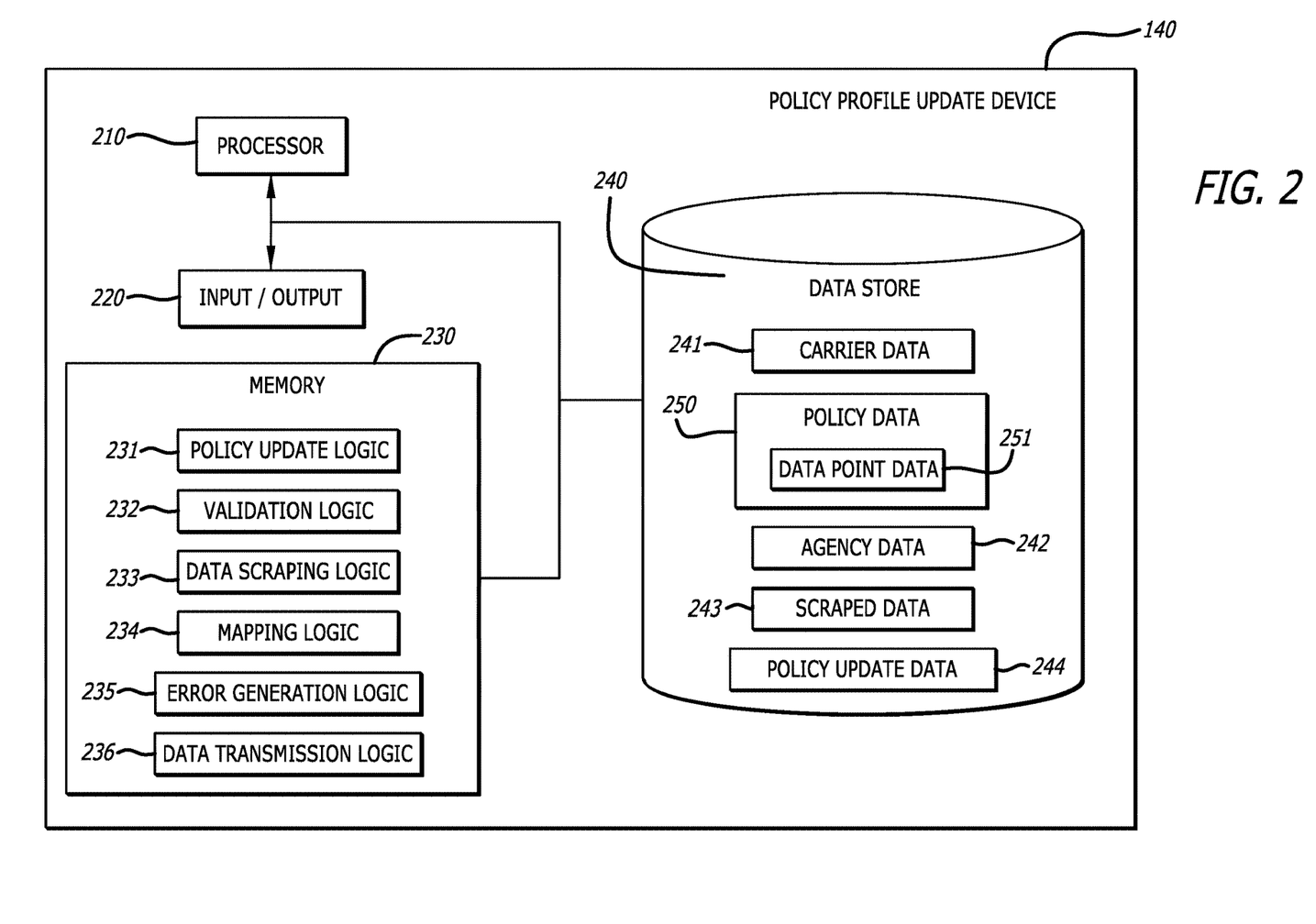
FIG. 2 is a conceptual block diagram of a policy profile update device in accordance with an embodiment of the invention.

Referring to FIG. 2, a conceptual block diagram of a policy profile update device 140 in accordance with an embodiment of the invention is shown. As discussed above, a policy profile update device 140 may be embodied as a unique device as depicted in FIG. 1 that is communicatively connected to at least an AMS. In further embodiments, the policy profile update device 140 may be configured within the AMS either as a hardware or software module. In particular embodiments, the policy profile update device 140 may be configured as a software application run on a personal and/or mobile computing device.

The policy profile update device 140 as depicted in FIG. 2 comprises at least a processor 210, memory 230, inputs and outputs 220, and a data store 240. The memory 230 may include policy update logic 231, validation logic 232, data scraping logic 233, mapping logic 234, error generation logic 235, and/or data transmission logic 236. The data store 240 may comprise various types of data including, but not limited to, carrier data 241, agency data 242, scraped data 243, policy update data 244, and policy data 250 which may further include data point data 251. As discussed previously, the various data types and logics may be configured in various ways depending on the application desired including combining, omitting, or adding logics and data types.

In many embodiments, policy update logic 231 can be configured to facilitate the policy profile update process. As discussed in more detail in the figures below, the policy update logic 231 can coordinate the process of anticipating and generating various data points within a number of policies to seek out for updating. This coordination can occur in conjunction with the other various logics 232-236 along with the available data 241-244, 250-251. For example, in certain embodiments, the policy update logic 231 may initiate the policy update process in response to one or more predetermined thresholds being exceeded. The thresholds and evaluations of exceeding them can be directed by the policy update logic 231.

In additional embodiments, the policy update logic 231 may include one or more machine learning processes. As described in more detail below within the discussion of FIG. 7, machine learning processes can be configured to generate increased efficiency within the policy profile update device 140. By way of example, the machine learning processes within the policy update logic 231 may be configured to evaluate each data point or data point type within available policies and generate at least a probability that is associated with the likelihood that the data point or data point type is currently incorrect or otherwise out of date (i.e., "stale"). In this way, the machine learning process(es) may exclude or limit the data sought through the policy profile update process. This machine learning-based process may further be enhanced by generating ground truth data based on the results of the policy profile update process which may be used within a closed loop to retrain the one or more machine learning processes (e.g., via a reweighting of a model, etc.).

In various embodiments, validation logic 232 may be utilized to access CMS data that is otherwise not available to the public. CMSs may be deployed with one or more publicly facing interfaces such as a HTML-server style webpage or website. Certain policy data that is available through a CMS website may have access limited only to users with a particular authorization. Typically, an agent/broker will have proper credentials to access non-public CMS webpages.

Therefore, validation logic 232 can be configured to automate the process of gaining access to non-public CMS webpages. In certain embodiments, the agent/broker may securely store their CMS credentials within the validation logic 232 which may then input the credentials when prompted by the CMS. As the policy profile update process can include numerous policies and a plurality of carriers, the agent/broker may store multiple credentials such that they are not prompted numerous times during the policy profile update process.

Indeed, certain carriers may require inputting credentials at rates and frequencies. For example, one carrier may need to verify credentials upon viewing each non-public CMS webpage, while others may store credential authorization within a cookie format that allows for access during a particular time period. The validation logic 232 can be configured to track and anticipate those rules, which, in some embodiments, may be utilized by the mapping logic 234 to better optimize the scraping process.

In a number of embodiments, data scraping logic 233 can be configured to directly interface and gather various data from the CMS system. As described above, CMS webpages can be utilized to find policy profile data that may be more up to date compared to the currently stored policy data 250. In additional embodiments, the data scraping logic can scan the CMS webpages to determine one or more fields and/or data point data 251 and then copy that data to the scraped data 243 within the data store 240.

Scraping can be accomplished through a hypertext markup language (HTML) or cascading style sheet (CSS) tag identification process. In more embodiments, the location of data to scrape may be determined from one or more templates, or other preconfigured processes that are preconfigured for each specific page. In certain embodiments, the data scraping logic 233 may compare the data to be scraped against the currently stored policy data 250 or data point data 251 to verify the process is operating correctly before continuing. For example, when scraping for a particular calendar date, the data scraping logic 233 may attempt to first verify that the target data to scrape is in the format of a calendar date. In further embodiments, a comparison may be made to verify any difference in data prior to storage within the scraped data 243.

In particular embodiments, mapping logic 234 can be configured to more efficiently direct the scraping process by generating a more efficient order of operations. For example, if one CMS webpage comprises multiple data points that are sought, the mapping logic 234 can direct the data scraping logic 233 to load the CMS webpage a single time and pull and process the multiple data points prior to loading another page instead of perhaps loading the same CMS webpage over and over again for each data point sought. In additional embodiments, the mapping logic 234 may also receive policy data 250 from multiple carriers to process which can yield a mapping that organizes policy loads that are sorted by carrier to perhaps reduce the amount of validation logins or CMS webpage loads.

In many embodiments, the mapping logic 234 will receive data relating to the pool of policies and/or data points that are requested to be updated prior to web scraping. In response to receiving this data, the mapping logic 234 may generate a scraping map that can direct the entire process of data scrapping such that one or more efficiencies are better realized. In some embodiments, the mapping logic 234 may account for available computing and or network resources when generating a map. For example, a policy profile update device 140 may have multiple available network connections to one or more CMSs. A map may be generated that can reduce processing time by utilizing the known available connections to scrape multiple CMS systems at once. This type of mapping may, in certain embodiments, take into account current or know network conditions and/or CMS loading and response times.

In numerous embodiments, error generation logic 235 may be utilized to generate and provide a user that one or more errors has occurred during the policy profile update process. As shown in more detail below, errors may be generated in various ways including, but not limited to, invalid credential errors, policy or other data not found errors, and/or invalid data format or output type errors. Errors may be in the form of screen prompts, emails, text/SMS messages, and the like. The response of the policy profile update device 140 to one or more errors may be preconfigured. Responses may continue and/or stop the update process as configured. As those skilled in the art will recognize, the error generation logic 235 may also be configured with a catch all error generation associated with an unidentified error. The errors described herein are simply for illustrative purposes and are not meant to be limiting.

In further embodiments, data transmission logic 236 can facilitate the transfer of the data from the policy profile update device 140 to the AMS. In many embodiments, the policy profile update process generates scraped data 243 within the data store. The data transmission logic 236 can be configured to process and/or format the scraped data 243 into a form of policy update data 244 which may then be passed onto the AMS. The processing of the scraped data 243 is typically needed as each AMS can be configured with a unique or otherwise proprietary method of policy update data intake.

As described above, various AMSs can be configured to accept batch data as an AL3 formatted file. The data transmission logic 236 can facilitate the conversion of the raw scraped data 243 to policy update data 244 that conforms with the AL3 format which can then be transferred to a suitable AMS. However, multiple data formats may exist, and in certain embodiments wherein the AMS may not have a direct batch input method, the policy update data 244 may be formatted in a form that allows for the batch input via a separate program or other automation tool. As those skilled in the art will understand, the data transmission logic 246 can be configured to format or otherwise process scraped data 243 to any other suitable format for processing by an AMS.

The data store 240 may be configured as a physical storage device within the policy profile update device 140 as depicted in the embodiment of FIG. 2. In additional embodiments, the data store 240 may be a separate or external device physically connected to the policy profile update device 140. In further additional embodiments, the data store 240 may be situation in a remote client, such as a cloud-based server and provides data read/write access upon demand of the policy profile update device 140. As those skilled in the art will recognize, the format and type of data available within the data store 240 can vary greatly and may be configured as needed, including combining one or more data structures together.

In a number of embodiments, carrier data 241 may comprise data specific to each of a plurality of insurance carriers that the AMS may interface with. By way of example and not limitation, the carrier data 241 may include CMS type, CMS location/web address. agent/broker carrier credentials, preconfigured carrier scraping templates, publicly available data points, and/or links to associated policy data 250. Carrier data may be stored as separate data files or can be realized as a single multi-dimensional data structure.

In more embodiments, policy data 250 can include any data related to one or more policies associated with the AMS. An agent/broker may have numerous customers with a plurality of policies between them. Each policy can be associated with unique policy data 250. It is contemplated that the policy data can be a very large number of separate account files, wherein each unique policy data 250 is associated with a single policy that comprises a plurality of individual or atomic pieces of data point data 251.

Data point data 251 can be understood through example. Each insurance policy may have discrete pieces of data associated with that policy. Furthermore, many discrete pieces of data may be duplicated or repeated over many different accounts. For example, each policy is likely to be associated with a customer (i.e., "insured"), each policy will have a policy number or other identification data, each policy will have a current status, billing address, billing method, and/or billing history. It is contemplated that policy data 250 may comprise many more types of data point data 251 than are described herein.

It is during the policy profile update process that the data point data 251 is checked and updated. The updating of the various data point data 251 will yield an overall current policy data 250 for each policy. In some embodiments, the policy profile update process may simply receive an external mapping or may be preconfigured to scrape all data and pass it off to the AMS for further processing, comparing, and updating. In these embodiments, policy data 250 may not be present within the policy profile update device 140. This type of embodiment can be more suitable for security-conscious applications wherein the processing is to be done on an external server, device, or mobile computing device susceptible to theft.

In many embodiments, agency data 242 may comprise data related to the specific agency utilizing the policy profile update device 140. For example, the policy profile update device 140 may be operating by a third party (i.e., not owned by the agency/broker utilizing it) in which the data relating to each agent/vendor that may utilize the policy profile update device 140 is stored within the agency data 242. In further embodiments, an agent and/or broker may operate under multiple business names and/or jurisdictions which require specialized rules to comply with various laws and/or regulations. Agency data 242 can be utilized to change one or more methods of operation based on the legal entity that is currently operating the policy profile update device 140. Finally, agency data 242 may also indicate what format to process the output data to prior to transmission.

In various embodiments, scraped data 243 may simply be the raw data that is taken from one or more CMSs by the data scraping logic 233. Scraped data 243 can be in various formats which may include a multitude of various individual pieces of data or may include a log or other single data structure that is appended in response to new data being scraped and stored. In certain embodiments, scraped data 243 comprises data that has already been parsed and verified as new. (i.e., more current) data point data 251. In other embodiments, the scraped data 243 may simply be a collection of all data read or otherwise evaluated by the data scraping logic 233 prior to being processed into policy update data 244.

In numerous embodiments, policy update data 244 can be data formatted for transfer to an AMS. As discussed above, the data transmission logic 236 may often generate the policy update data 244 by processing the scraped data 243 into a format that is suitable for the requesting AMS. In various embodiments, policy update data 244 may be a file that can be transmitted, passed, or otherwise sent to the AMS. In further embodiments, the policy update data 244 may be compressed or otherwise encapsulated within a security layer prior to transmission if the data is to travel over a public network such as the Internet.

Figure 3:
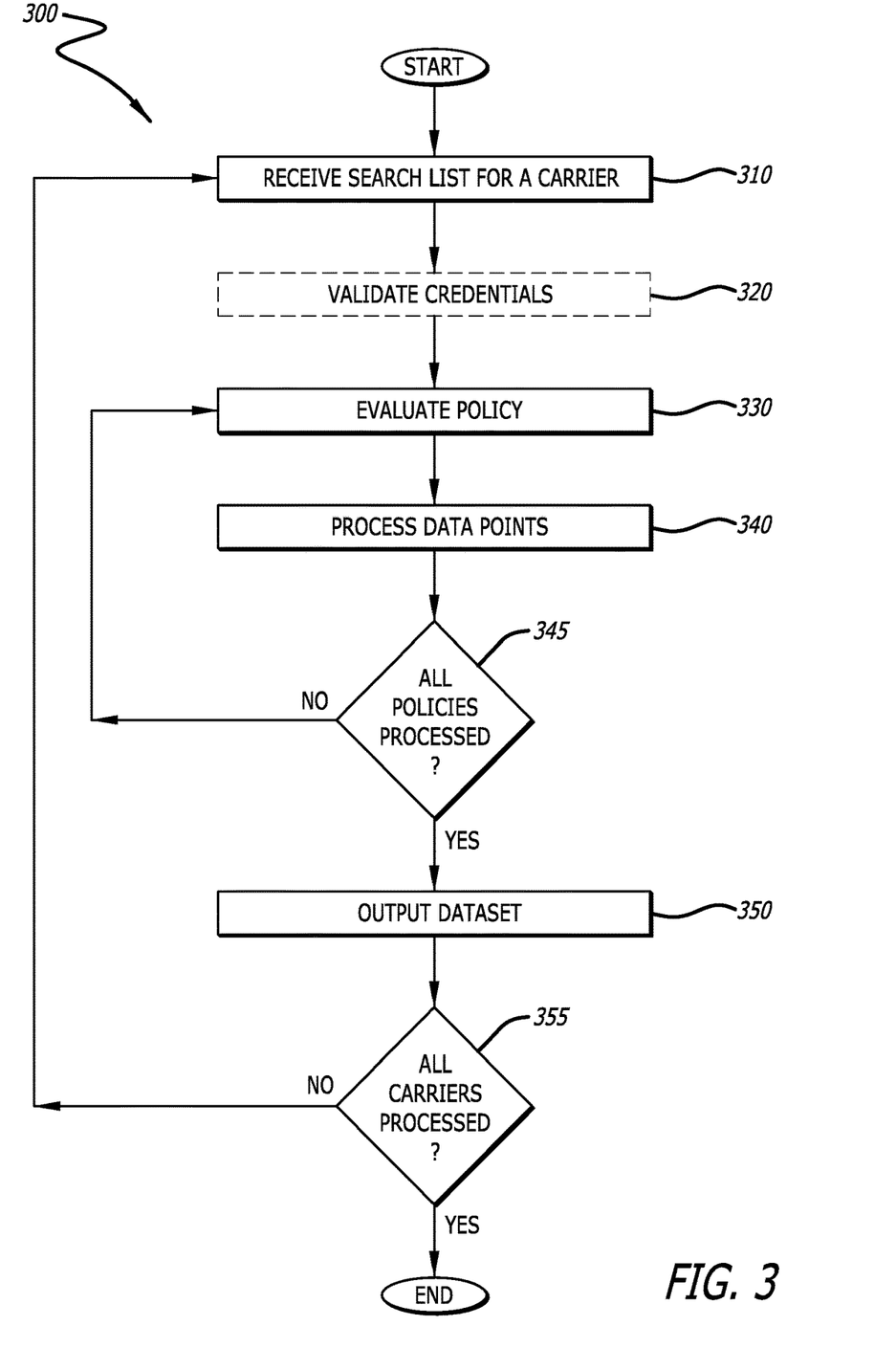
FIG. 3 is a high-level flowchart depicting a policy profile update process in accordance with an embodiment of the invention.

Referring to FIG. 3, a high-level flowchart depicting a policy profile update process 300 in accordance with an embodiment of the invention is shown. Broadly, the process 300 of updating policy profile data can be initiated when a search list for one or more carriers is received (block 310). As discussed above, the search list can be configured as a list of general policies to scrape in their entirety or may be a map that directs the scraping to occur in an organized and more efficient method. Additionally, the policy profile update device may self-generate the list through one or more methods including one or more machine-learning based processes. Once the list of data to search for with the carrier is known, credentials can be validated when the CMS requires it (block 320). Although optional, this step is often required to gain access to many policy data point data types.

Once granted access to the CMS, the process 300 can evaluate a policy, which can typically occur by loading one or more webpages associated with that policy (block 330). Each webpage can be loaded through typical web browser resources such as utilizing a universal resource locator (URL) address. Once loaded, one or more data points can be processed (block 340). In many embodiments, the processing of the data point is simply to scrape the data. In further embodiments, the scraped data can be compared to the currently known data to determine if it is useful and/or more current.

Once the data points have been processed, a determination can be made to evaluate if all policies within the received search list have been evaluated (block 345). If other policies are required to be evaluated, the process can return and again load and evaluate a new policy (block 330). When all policies have been processed, the acquired data set can be processed for output to the AMS (block 350). It is contemplated however, that certain embodiments may withhold outputting the dataset until all carriers have been processed (indicating that the received search list comprised multiple carriers as well).

Prior to ending, the process 300 can evaluate if all available carriers have been processed (block 355). If other carriers remain to be processed, the process 300 can receive and process another search list associated with a new carrier (block 310). However, if all carriers have been processed and/or evaluated, then the process 300 may end. It is finally contemplated that the process 300 as depicted in FIG. 3 may be adjusted based on the format of the data points sought. For example, data points for acquisition may be more efficiently scraped by loading up a separate webpage or document (e.g., a spreadsheet) that may contain a single data point across multiple policies. In these embodiments, it would be more prudent to load and evaluate data based on data point type and not by policy.

Figure 4:
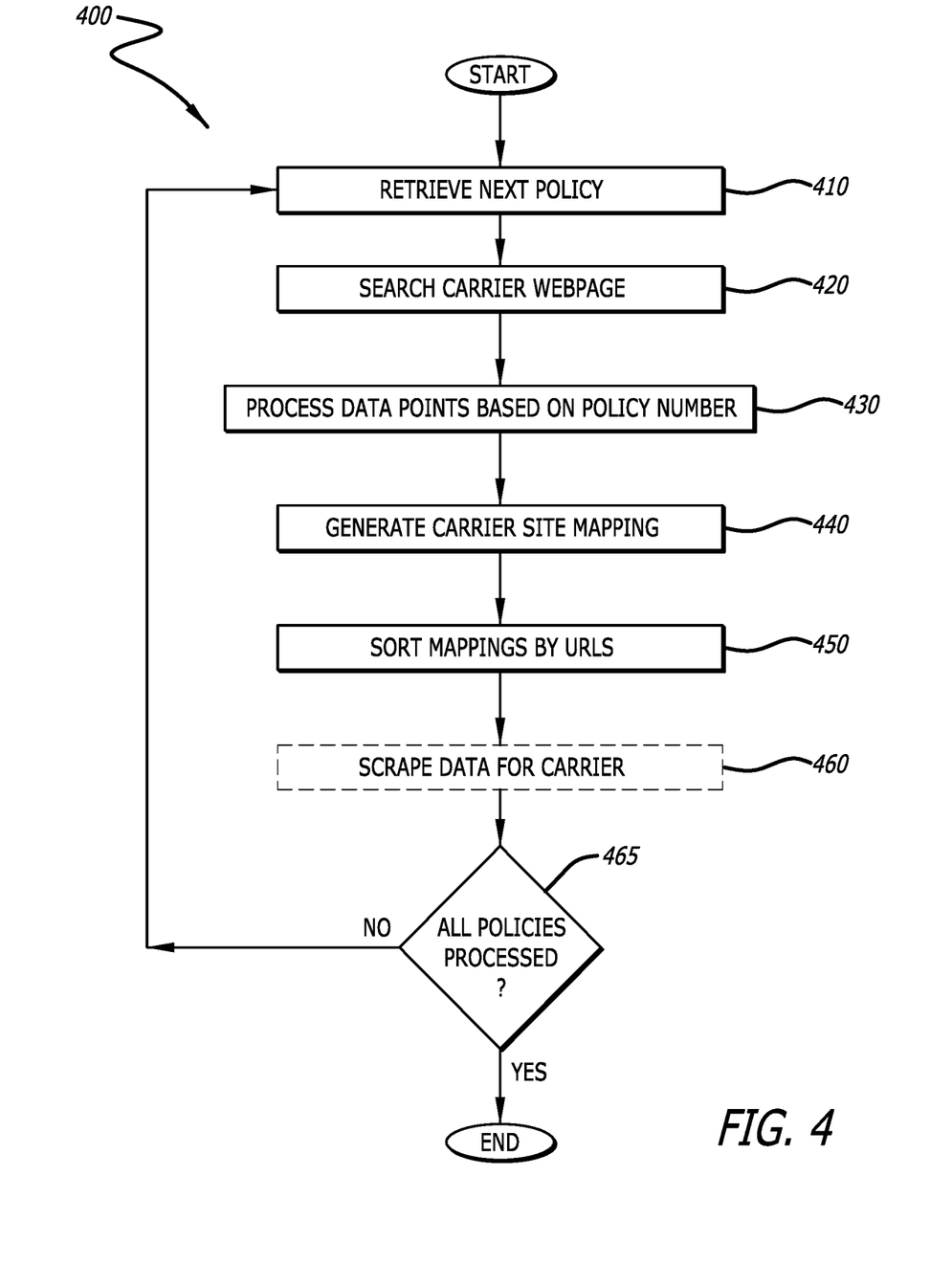
FIG. 4 is a flowchart depicting a process for selecting and organizing data points for scraping in accordance with embodiments of the invention.

Referring to FIG. 4, a flowchart depicting a process 400 for selecting and organizing data points for scraping in accordance with embodiments of the invention is shown. As discussed above, a mapping may be done based on all of the received policy data points to update. Each selected policy should be evaluated and associated with one or more carrier website details.

Once directed to evaluate a plurality of policies for updating, the process 400 can begin by retrieve a first (next) policy (block 410). The process 400 can then search the associated carrier webpages for formats and/or locations of the desired data point data (block 420). In a variety of embodiments, the policies will be provide in a multidimensional array. Each policy typically has one or more policy numbers or various unique data points associated with the policy. The location of each policy within the multidimensional array can be determined and processed based on that policy number and/or unique data points. In many embodiments, the processing of the policy may be based on the policy number or unique identifiying data point (block 430). In certain embodiments, this step may not be required as a preconfigured template for each carrier and/or data point data type may provide the process 400 the necessary data to process the data without reaching out to or otherwise loading the carrier website. In further embodiments, the processing may be done on data copied from the multidimensional array and then updated, reinserted, or copied back into the array after processing.

When all known data regarding the policy is known, the process can begin mapping and sorting the maps based on the associated URLs (blocks 440 and 450). As discussed above, the generation of maps can be configured to minimize processing time or compensate for available network bandwidth. In certain embodiments, it may be computationally prudent to scrape data from the carrier during the mapping process (block 460). For example, when a new data point is searched for on the carrier website, or when the carrier website has changed formats such that mapping has become unsuitable, the process 400 can simply scrape all available data during the investigation and searching steps and abandon the mapping process.

However, once the policy has been processed for scraping and mapping, the process 400 can evaluate if all policies have been processed (block 465). When more policies are to be retrieved and evaluated, the process 400 can move to the next policy (block 410). When all policies have been retrieved and processed, the process 400 can end. However, it should be noted that many embodiments of the present disclosure will process all available policies prior to generating map data to avoid reprocessing upon each new policy evaluation. The structure of the process 400 can vary depending on the desired application and can dynamically change in response to various conditions such as the size of the policy list to evaluate and/or the available computational resources.

Figure 5:
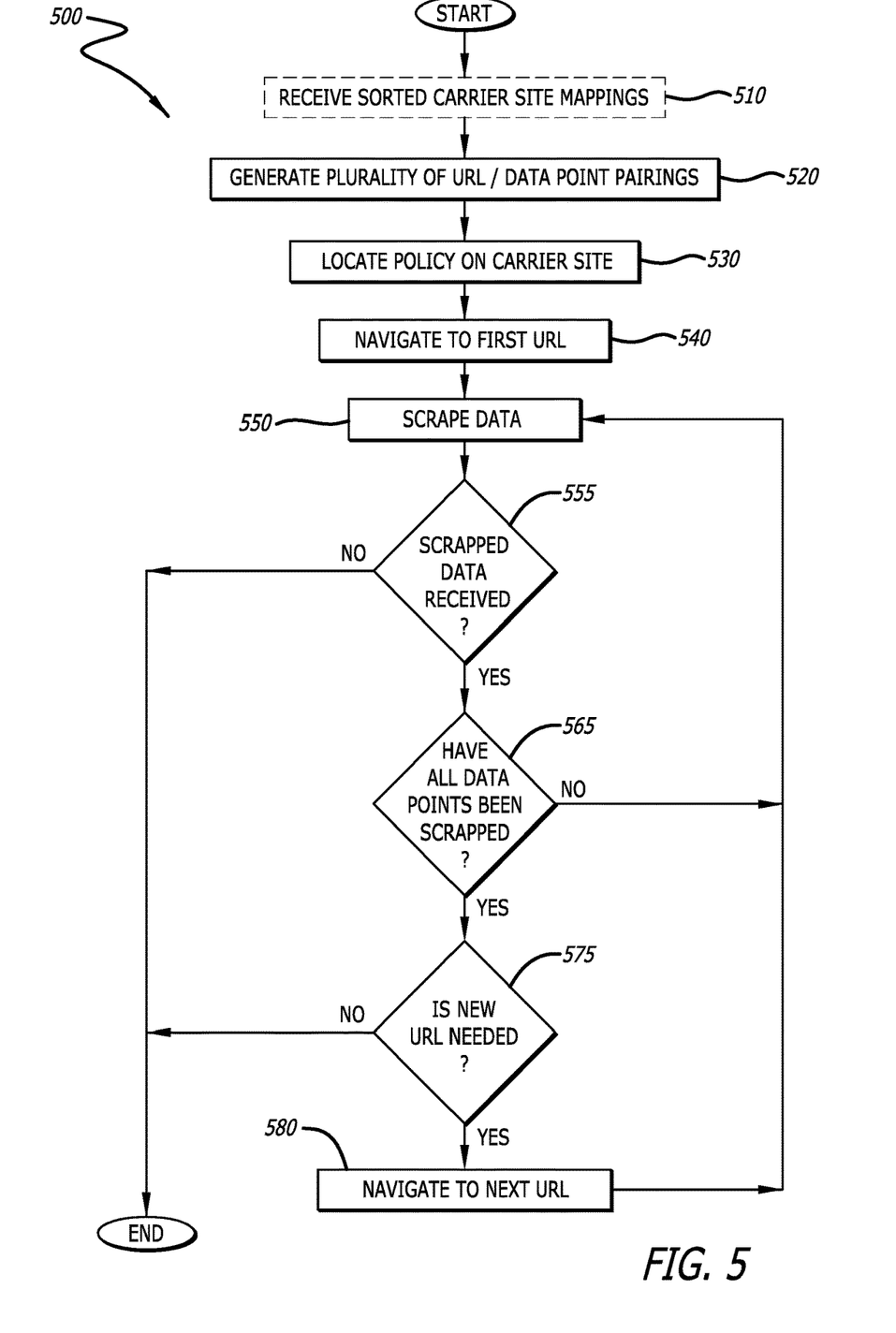
FIG. 5 is a flowchart depicting a process for scraping data utilizing universal resource locators (URLs) in accordance with an embodiment of the invention.

Referring to FIG. 5, a flowchart depicting a process for scraping data utilizing universal URLs in accordance with an embodiment of the invention is shown. As described above, the process of gathering updated data point data often comprises scraping data from one or more webpages associated with a CMS. The process 500 can be optimized by receiving a sorted carrier site mapping(s) (block 510). Typically, the generated map data is sorted or otherwise broken up by carrier. While not always required, various embodiments may utilize mapping data to make the scraping process more efficient.

In many embodiments, the scraping of data requires a plurality of URL and data point pairs to be generated (block 520). Each piece of data point data to be updated can be logically paired with an associated URL that can indicate where to find the data point data. In various embodiments, the pairing of the data point data and the associated URLs is done during the mapping process.

Once paired, the process 500 can locate or otherwise load the policy associated with the selected data point via the paired URL of the carrier site (block 530). In a number of embodiments, the policy may require multiple data points to be loaded from the CMS, and each data point may be on one or more different URLs. Therefore, the process 500 can, in those embodiments, navigate to the first URL associated with the policy number (block 540). Once loaded, the data can be scraped into the scraped data within the data store (block 550).

In certain instances, it may happen that the CMS will have scraping protection. In other cases, the data expected at one location is not available, or the entire webpage may not be available due to a network communication error. Thus, the process 500 can evaluate if the scrapped data was properly received (block 555). When the desired scraped data has not been received, the process 500 can end. In various embodiments, the process will generate and send an error message indicating what specific problem occurred causing the process 500 termination.

When the scraped data has been received, the process 500 can evaluate if all data points have been scraped from the currently loaded URL (block 565). As described above, mapping may generate efficient orders that can group multiple scrapings on a single URL. If more data points are to be scraped, the process 500 can begin the next data scraping (block 550). However, when all data points have been scraped, the process 500 can then evaluate if another URL should be loaded (block 575). If more URLS are scheduled to be loaded, the process 500 can then navigate to the next URL (block 580). From there, more data scraping can occur (block 550). Conversely, when all URLs have been loaded and scraped, the process 500 can end.

Figure 6:
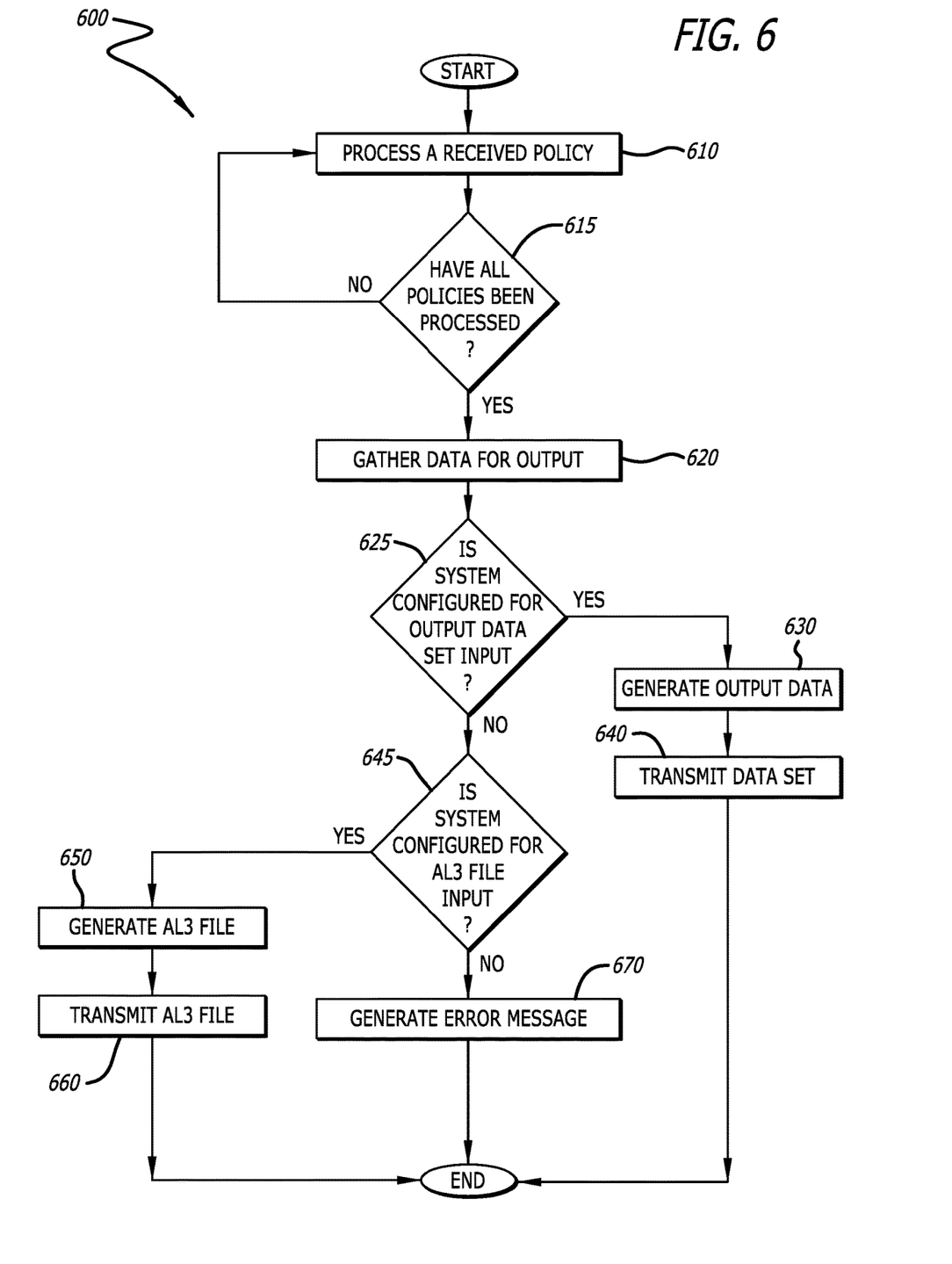
FIG. 6 is a flowchart depicting a process for generating updated policy output data in accordance with an embodiment of the invention.

Referring to FIG. 6, a flowchart depicting a process 600 for generating updated policy output data in accordance with an embodiment of the invention is shown. The scraped data gathered during the policy profile update process can be formatted and transmitted to an AMS in a variety of formats. The process 600 for generating output data typically begins by processing one or more received policies (block 610). Upon completion of processing the policy, a determination can be made to see if all policies have been processed (block 615). Upon completion of processing all policies, the process 600 can then gather the scraped data for output processing (block 620).

As discussed above, various AMS systems may be configured to accept specific formats of batch data input. Each AMS can have data within the profile policy update device that can indicate the specific format required for input into the AMS. Therefore, the process 600 can determine if the system is configured for a specific output data set input (block 625). When it is determined if the AMS can handle a specific format, the process 600 can then process and generate the output data suitable for the AMS (block 630). Upon completion of the output data generation, the process 600 can transmit the data set to the AMS (block 640). In many embodiments, transmission of the output data set may simply be to pass the output to the AMS as a return data structure. In additional embodiments, the transmission of the data set may be over a network connection such as the Internet, which may require the transmission step to include one or more security encapsulation measures.

When there is no specific format of output data provided, the process 600 can instead evaluate if the AMS is configured to accept an AL3 or similarly proprietary formatted file (block 645). When it is determined that an AL3 file is acceptable, the process 600 can generate the AL3 formatted output data file (block 650). Upon completion of the AL3 file generation, it may be transmitted to the AMS (block 660). Similar to the discussion of transmitting the output data, transmission of the AL3 file may occur in numerous ways including software transmission between processes, or via a physical/external connection between devices.

When it is determined that the AMS cannot accept either a specific output data format or an AL3 formatted file, the process 600 can generate one or more error messages (block 670). Error messages can be generated for display on a user interface or may be transmitted to a user or AMS administrator via email, text/SMS, specialized software notification, or the like. In a number of embodiments, the generated error message may provide one or more prompts for selection of a data output format which may continue the process 600 upon selection instead of aborting it.

Figure 7:
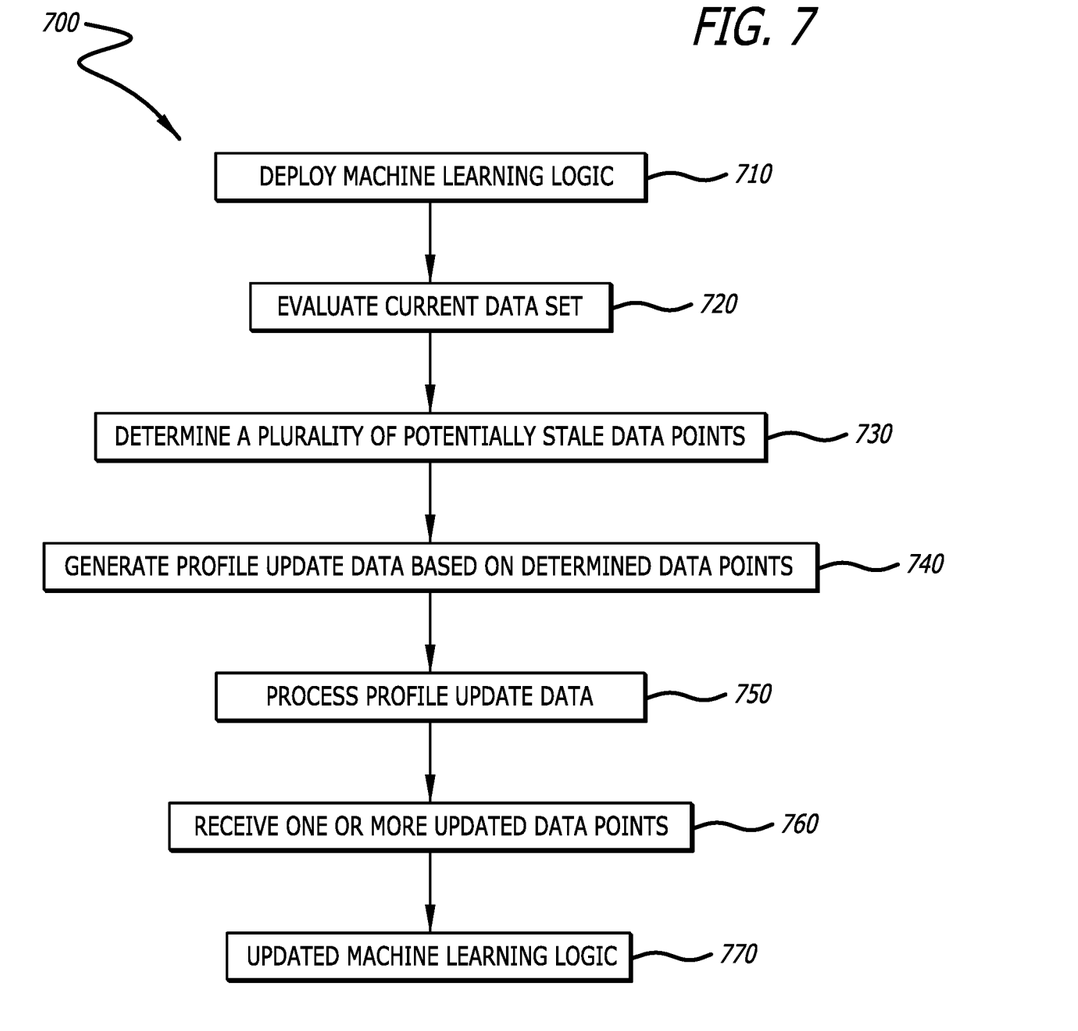
FIG. 7 is a flowchart depicting a process for utilizing machine learning processes to select data points for updating in accordance with an embodiment of the invention.

Referring to FIG. 7, a flowchart depicting a process for utilizing machine learning processes to select data points for updating in accordance with an embodiment of the invention is shown. There is a desire to create efficient updating processes to keep AMS policy data current with CMS policy data. Machine learning processes can facilitate this by fine-tuning the time between updating and selecting which items should be evaluated. An example use of machine learning within a policy profile update system is depicted within FIG. 7.

The process 700 can begin by deploying one or more machine learning logics (block 710). As described above in the discussion of FIG. 2, machine learning logic may be incorporated within another logic such as a more generalized policy update logic. However, in certain embodiments, machine learning logic may be deployed and or otherwise activated separately, or in response to one or more conditions being met such as a software or hardware upgrade. Once available, the machine learning can begin to focus the selection of specific data points for updating.

In order to generate inferences or other predictions, the process 700 can first evaluate the current data set within the AMS (block 720). In certain embodiments, the initial data needed to operate the machine learning processes may be provided as a preconfigured weight set or may be summarized within an anonymized set of training data that may or may not be associated with the current policy data within the AMS. Finally, a manual input may occur that generates a set of initial ground truth data for the machine learning processes.

Once configured, the machine learning processes can determine a plurality of potentially stale or otherwise non-current data points (block 730). In various embodiments, the process 700 can make this determination based on a number of factors including, but not limited to, the type of data evaluated (e.g., billing info tends to change more frequently than dates of birth, etc.), the time since the last update (e.g., updates to billing payments are not likely to change in under one month), and/or the overall history of the policy (younger customers are more likely to change data compared to older customers). The determination of stale data points can occur as frequently or infrequently as required by the desired application. Based on these types of evaluations, a probability can be determined on each data point indicating the change of the data being updated.

Once one or more stale data points have been determined, the process 700 can generate profile update data that should be scraped to verify accuracy (block 740). As opposed to embodiments where the list of data points and policies to verify are simply received by the policy profile update device, the machine learning processes can internally generate data points to verify. This can help increase system efficiency by anticipating and automating the verification of policy data. Once generated, the profile update data list can be either utilized or transmitted to another device.

The process 700 can then process the profile update data (block 750). In a number of embodiments, this is accomplished in a manner similar to the discussion above with respect to FIG. 5. During or afterward, the process 700 can receive one or more updated data points (block 760). Once received, the machine learning processes can compare the scraped updated data point data with the determined probability associated with that data point. In response a determination can be made related to the accuracy of the determined probability.

The process 700 may finally update the machine learning logic based on the comparison done between the determined probability of the actual data point data (block 770). As those skilled in the art will understand, the determination of a correct prediction made by the machine learning process will be configured to strengthen the relative associations (i.e., weights) with that determination, while an incorrect prediction will have the opposite effect. In certain embodiments, the comparison is an automated process. However, further embodiments will provide a method for ground truth generation by allowing a user (such as the agent/broker) to verify the correctness of scraped data. This process can continue the training process of the one or more machine learning processes within the policy profile update system.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A policy profile updating device, comprising:
a processor; and
a memory communicatively coupled to the processor, the memory comprising:
policy update logic, processed by the processor, configured to
receive a plurality of data points for updating;
parse the plurality of data points for data collection;
generate uniform resource locator (URL) data for each data point type within the plurality of data points;
associate each data point within the plurality of data points with at least one generated URL data;
data scraping logic, processed by the processor, configured to utilize the generated URL data to locate and copy updated data point data related to the associated data point for each data point;
mapping logic configured to direct the data scraping logic to load a first webpage a single time and process a plurality of data points prior to loading a second webpage;
wherein data associated with the plurality of data points is paired with the generated URLs during a mapping process; and
data transmission logic, processed by the processor, configured to format the updated data point data for transmission.

2. The device of claim 1, wherein the ordered mapping of data points is sorted by URL addresses.

3. The device of claim 1, wherein the policy update logic is further configured to utilize one or more previously trained machine learning processes to determine at least one probability for an available data point associated with the likelihood that the available data point is currently incorrect.

4. The device of claim 3, wherein the policy update logic further parses the plurality of data points by deleting one or more data points for processing based on the determined probability associated with that one or more data point.

5. The device of claim 3, wherein the one or more machine learning processes further:
compares the scraped updated data point data with the determined probability associated with that data point;
determines the accuracy of a determined probability;
generates updated training data based on a determined correctness; and
trains the one or more machine learning processes with the updated training data.

6. The device of claim 1, wherein the plurality of data points for updating is received after a predetermined period of time.

7. The device of claim 1, wherein the plurality of data points for updating is received in response to an external request.

8. The device of claim 1, wherein the formatting of the updated data point data is configured in an AL3 format.

9. The device of claim 1, wherein the memory further comprises validation logic, processed by the processor, configured to transmit authentication data to one or more carrier servers.

10. The device of claim 9, wherein the device is granted increased access to one or more URL locations associated with the one or more carrier servers in response to transmitting the authentication data.

11. The device of claim 1, wherein the received plurality of data points is associated with multiple policies.

12. The device of claim 11, wherein the multiple policies are associated with a single carrier.

13. The device of claim 11, wherein the received plurality of data points is associated with a plurality of carriers.

14. The device of claim 13, wherein the parsing of the plurality of data points for data collection is based on the plurality of carriers to create one or more policy update batches that sorts the multiple policies into batches sorted by the associated carrier for each policy.

15. The device of claim 14, wherein, the policy update batches are processed sequentially by associated carrier.

16. A method of updating policy profiles, the method comprising:
- utilizing machine learning processes to determine probabilities associated with the likelihood that an available data point within a set of currently available data points is incorrect;
- generating a plurality of policy profile data points based on the determined probabilities;
- parsing the plurality of data points for data collection;
- generating uniform resource locator (URL) data for each data point type within the plurality of data points;
- associating each data point within the plurality of data points with at least one generated URL data;
- utilizing the generated URL data to locate and copy updated data point data related to the associated data point for each data point;
- loading a first webpage a single time and processing a plurality of data points prior to loading a second webpage;
- wherein data point data is paired with generated URLs; and
- formatting the updated data point data for transmission.

17. The method of claim 16, wherein the generation of the plurality of policy profile data points comprises selecting one or more data points for processing based on the determined probability associated with that one or more data point indicating that the generated plurality of policy data has an increased risk of being incorrect.

18. The method of claim 16, wherein the method further includes:
- comparing the scraped updated data point data with the determined probability associated with that data point;
- determining the accuracy of a determined probability;
- generating updated training data based on a determined correctness; and
- training the one or more machine learning processes with the updated training data.

19. The method of claim 16, wherein the received plurality of data points is associated with a plurality of carriers.

* * * * *